March 6, 1945.  A. L. SOHM  2,370,885
POWER TOOL
Filed Oct. 29, 1943    3 Sheets-Sheet 1

INVENTOR.
ALFRED L. SOHM,
BY
ATTORNEY.

INVENTOR.
ALFRED L. SOHM,
BY
ATTORNEY.

INVENTOR.
ALFRED L. SOHM,
BY
ATTORNEY.

Patented Mar. 6, 1945

2,370,885

UNITED STATES PATENT OFFICE 2,370,885

POWER TOOL

Alfred L. Sohm, Van Nuys, Calif., assignor to Dril-Tap Company, Van Nuys, Calif., a copartnership composed of John P. Corbett and Alfred L. Sohm Application October 29, 1943, Serial No. 508,268

11 Claims. (Cl. 10—138)

This invention relates to power tools and has for an object the provision of a power-driven tool of small, compact, and inexpensive design which is capable of performing with a high degree of efficiency numerous operations commonly employed in machine shop practice.

A further object of my invention is the provision of a power-driven tool which, while being capable of affording great convenience in performing a wide variety of mechanical operations such as grinding, burring, milling, and slotting, is particularly useful in connection with the operations of drilling and tapping.

A more detailed object in this connection is the provision of a power tool of the character described adapted to drive a drill at the proper speed for its optimum operation, and then to be adjusted so as to rotate at the reduced speed suitable for that size of tap for which the hole just drilled is of the proper diameter to insure the cutting of a satisfactory thread.

A further object of my present invention is to provide means for automatically reversing the direction of drive of the machine upon completion of a tapping operation so as to cause withdrawal of the tap from the tapped hole.

A still further object is to design the controls for operating the change-speed gearing in such a manner that they are subject to operation quickly and easily, and also so that the possibility of engaging both the gearing and the direct drive simultaneously is positively precluded.

The invention possesses other objects and valuable features, some of which, with those enumerated, will be set forth in the following description of the preferred embodiment of my invention illustrated in the drawings accompanying and forming part of the specifications. It is to be understood that I do not limit myself to the showing made by the said drawings and descriptions as I may adopt variations of the preferred form within the scope of my invention as defined by the claims.

Referring to the drawings.

Figure 1:
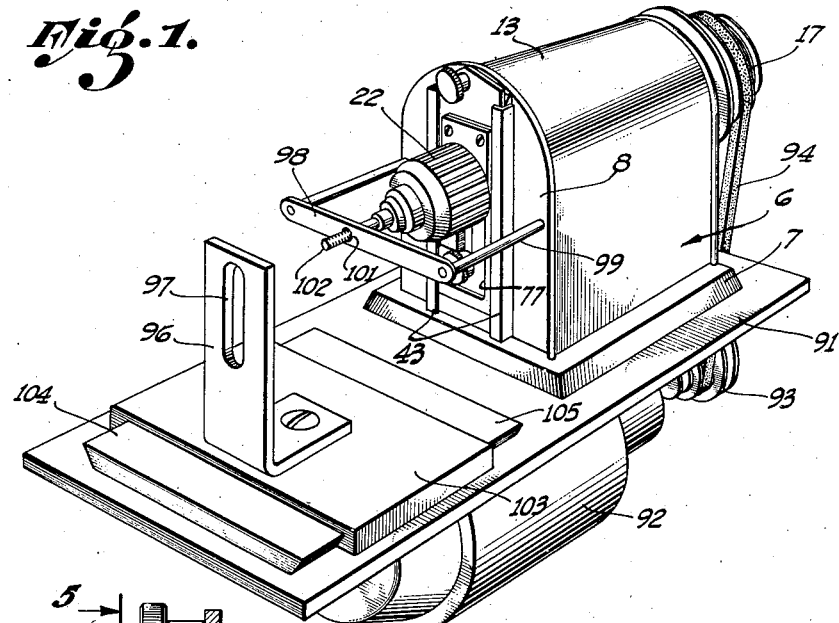
Figure 1 is a perspective view of a power tool embodying the principles of the present invention showing the device mounted in operative relation on a work bench with suitable guiding attachments in operative association therewith.

Specifically describing the preferred embodiment of my present invention, my improved power tool comprises a frame in the form of a base 7 having front and back legs 8 and 9 respectively, rising vertically therefrom, these legs being spaced apart sufficiently to provide a gear chamber 11 therebetween. Preferably an extension 12 of reduced lateral and vertical dimensions is provided upon the inner face of each of the legs 8 and 9 to accommodate a removable cover 13 which encloses the gear chamber 11.

A driving shaft 16 is journalled in the back leg 9 and has a pulley 17 secured to its outer edge, this pulley preferably being of the conical type to provide a plurality of steps 18 so that its driving belt 19 can be mounted in any of a plurality of optional positions thereupon and thereby make various possibilities in the speed at which the driving shaft 16 will be rotated. A driven shaft 21 is journalled in the front leg 8 in axial alignment with the driving shaft 16 and has mounted upon its front end exteriorly of the frame 6 a chuck 22 or other means for mounting a working tool such as a drill, tap or the like in axial alignment with the shaft 21. Both shafts 16 and 21 extend inward from their supporting legs 8 and 9 respectively, to a position substantially adjacent each other approximately midway between the two legs.

Figure 7:
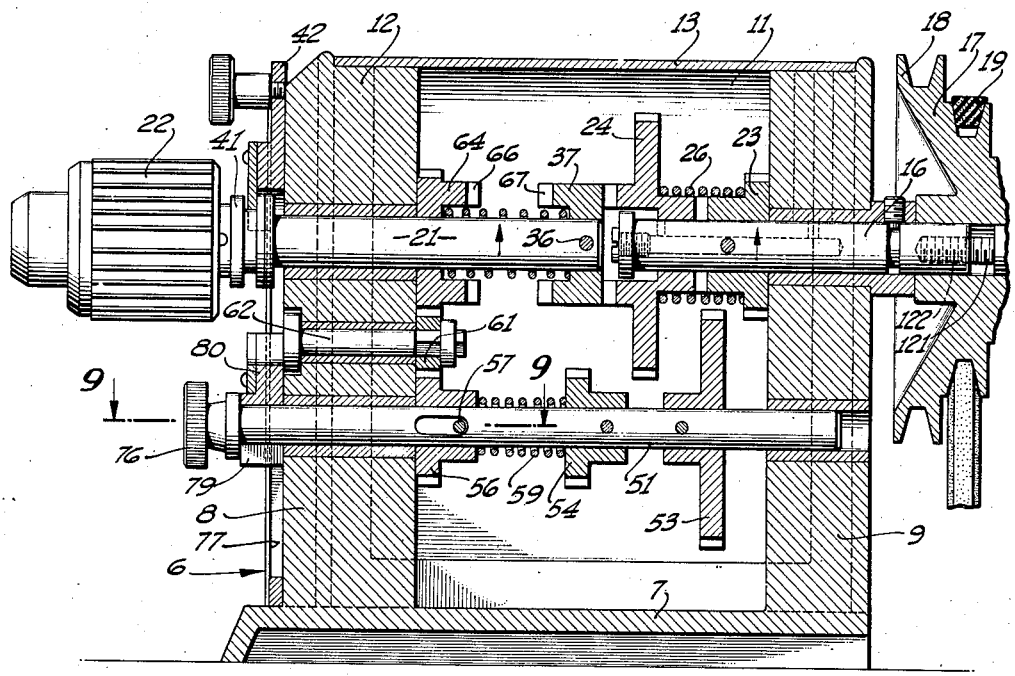
Figure 7 is a view similar to Fig. 2 showing the change speed gearing disconnected and the driven shaft coupled in direct drive to the driving shaft.
Figure 9:
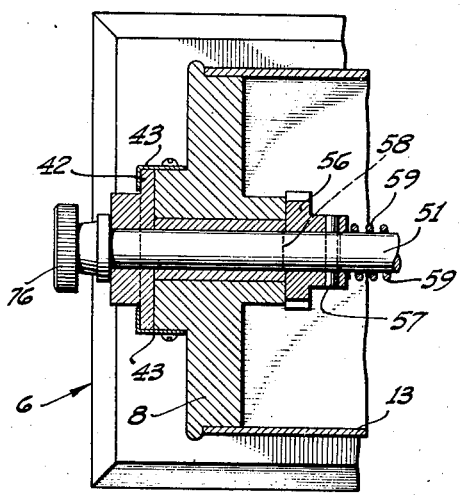
Figure 9 is a detail view in transverse, horizontal section, the plane of section being indicated by the line 9—9 of Fig. 7 and the direction of view by the arrows.
Figure 8:
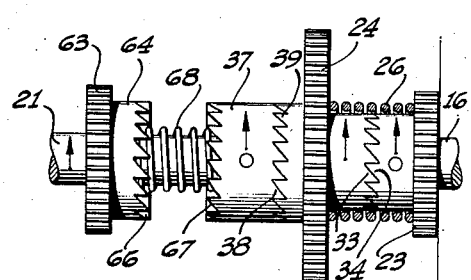
Figure 8 is a detail view in side elevation showing the manner of connecting the driven shaft to the driving shaft in direct drive.

A driving gear 23 is rigidly mounted upon the driving shaft 16 adjacent the back leg 9 of the frame; and a driven gear 24 is mounted upon the extreme inner end of the driving shaft 16 for free rotary and axial movement with respect thereto. A coil spring 26, under compression between two gears 23 and 24, urges the gear 24 toward the limit of its motion to the left as viewed upon Figs. 2 and 7. Motion of the gear 24 in this direction is limited by a disk 27 which is affixed to the associated end of the shaft 16 by a screw 28. The gears 23 and 24 are provided with hubs 31 and 32 respectively, extending toward each other and provided with ratchet teeth 33 and 34 respectively, on their proximal faces. Hence means are provided for keeping the driven gear 24 connected to the driving gear 23 to be rotated therewith by shifting the driven gear 24 to the right as viewed upon Figs. 2 and 7 against the action of the spring 26. Fig. 8 illustrates the driven gear 24 in this direct-coupled position.

Affixed to the inner end of the driven shaft 21, as by a rivet 36, is a head 37; and the inner or back face of the head 37 is provided with ratchet teeth 38 adapted to engage complementary ratchet teeth 39 on the forward face of the hub 32 of the driven gear 24. The driven shaft 21, in addition to being revoluble in its supporting leg 8, is capable of axial movement also. Before the shaft 21 reaches the limit of its inward movement, the teeth 38 on the inner face of the head 37 will engage the teeth 39 on the driven gear 24; but after this engagement has occurred the driven shaft 21 can be moved still further inwards thus carrying the driven gear 24 with it to effect engagement between the ratchet teeth 33 and 34, with the result that the driven shaft 21 is connected in direct drive to the driving shaft 16. Fig. 8 illustrates the associated parts in this position.

Means are provided for releasably locking the driven shaft 21 in its innermost position, i. e., in its position of direct drive. A flange 41 is preferably revolubly mounted on the shaft 21 just forward of the front leg 8. When the shaft 21 is in its innermost position the flange 41 preferably bears against the front face of the leg 8. A locking plate 42 is slidably mounted on the front face of the leg 8 as by a pair of opposed flanges 43. Preferably this locking plate 42 extends on both sides of the protruding forward end of the shaft 41, an aperture 44 being formed in the plate 42 through which the shaft 21 extends. Moreover, this aperture 44 is large enough to receive the flange 41 and thereby permit the shaft 21 to be slid inward when the locking plate 42 has been slid to that position in which it is completely removed from the path of the flange 41. After the shaft 21 has been slid to its innermost extreme position, the plate 42 can be slid downward still further to move a detent 46 in front of the flange 41 so as to prevent the shaft 21 from moving outwards again from its innermost position. This detent 46 is secured to the locking plate 42 at the upper edge of the aperture 44. Hence, it moves into retaining engagement with the flange 41 when the locking plate 42 is in its lowermost position, illustrated in Fig. 7.

Figure 2:
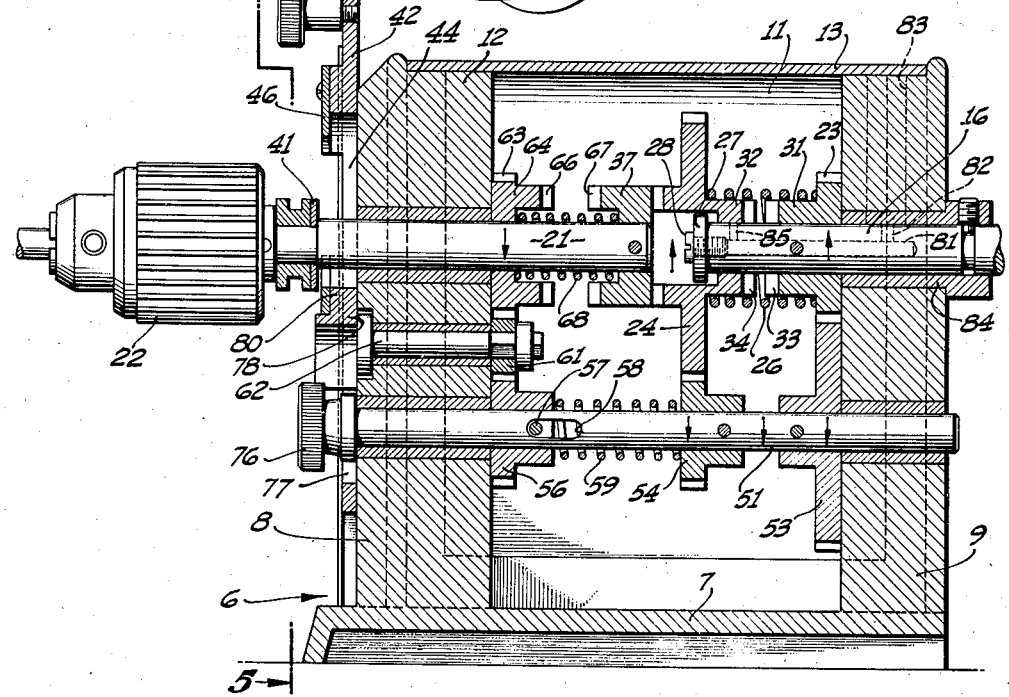
Figure 2 is an enlarged view of a power tool of the present invention in longitudinal, medial, vertical section, a portion of the figure being broken away to reduce its size. In this view the parts are shown in the respective positions assumed thereby for the performance of a tapping operation.

A countershaft 51 is journalled in the frame 6 extending across the gear chamber 11 below and parallel to the driving and driven shafts 16 and 21, respectively. However, in addition to being revolubly mounted, the countershaft 51 is also capable of axial movement from its innermost position as illustrated in Fig. 2, to its outermost or forward position as illustrated in Fig. 7. Large and small gears 53 and 54, respectively, are rigidly affixed to the countershaft 51 in such position thereon that when the countershaft is in its innermost position (Fig. 2) the larger gear 53 is enmeshed with the driving gear 23 and the smaller gear 54 is enmeshed with the driven gear 24, provided the driven gear 24 is pushed to the limit of its movement towards the front of the machine. As will be explained more fully hereinbelow, the driven gear 24 will have to occupy this extreme forward position before the countershaft 51 can be slid aft to bring its gears 53 and 54 into alignment with the gears 23 and 24.

Another gear 56, preferably having the same number of teeth as the gear 54, is mounted upon the countershaft 51 adjacent the inner face of the front leg 8. This gear 56 is splined to the countershaft 51 so as to connect the gear to the shaft for rotation therewith but to permit relative axial movement therebetween. One convenient manner of providing this connection is through the expedient of a pin 57 rigid with the gear 56 and extending through a slot 58 in the countershaft 51, which slot is extended axially of the countershaft 51 a sufficient distance to permit the shaft 51 full reciprocation through its necessary stroke without interference from the pin 57 although the gear 56 remains in contact with the inner face of the front leg 8. A coil spring 59, under compression between gears 54 and 56, continually urges the countershaft 51 aft, i. e., towards its innermost position as illustrated in Fig. 2.

The gear 56 is permanently enmeshed with an idler gear 61 which is revolubly mounted on a pin 62 rigid with the front leg 8; and this idler gear 61 is enmeshed with a gear 63 which is journalled for free rotation upon the driven shaft 21. The hub 64 of this gear 63 is provided with ratchet teeth 66 which are normally retained out of engagement with complementary ratchet teeth 67 on the forward face of the head 37 by means of a coil spring 68 under compression between gear 63 and the head 37. However, since the driven shaft 21 is axially slidable it can be pulled forward in its journal, compressing the coil spring 68, until the teeth 67 on the head 37 are brought into engagement with the teeth 66, it being understood of course that such engagement cannot take place until after the teeth 38 on the opposite face of the head 37 have been disengaged from the teeth 39 on the driven gear 24. Since the idler gear 61 is interposed between the gear 63 and the gear 56 which is rotated with the countershaft 51 the gear 63 will, whenever the countershaft 51 is in its innermost position, be rotated in the opposite direction from that in which the driving shaft 16 and the gear 23 and 24 carried thereby rotate. Hence when the driven shaft 21 is in its innermost position, engaging the head 37 with the driven gear 24, the chuck 22 will be rotated in a forward direction; but as when the shaft 21 is pulled forward to its outermost position engaging the head 37 with the reverse gear 63 the chuck 22 will be rotated in the reverse direction.

Accessible upon the forward, exposed end of the countershaft 51 is a knob 76 which provides a convenient fingerhold whereby the countershaft 51 can be pulled forward against the action of the coil spring 59, moving the countershaft from the position wherein it is illustrated in Fig. 2 to that of Fig. 7.

The function of the spring 59 of course is continually to urge the countershaft 51 inward to its Fig. 2 position wherein the gears 51 and 54 of the countershaft enmesh the gears 23 and 24 respectively. However, means are provided for preventing such inward motion of the countershaft until after the connection of the driven shaft 21 to the driving shaft 16 in direct drive is broken. Toward this end the locking plate 42 is extended downward past the countershaft 51, preferably being formed with a second aperture 77 through which the forward end of the countershaft 51 extends. The upper edge of this aperture 77 is defined by a detent 78 preferably bifurcated by a notch 79 large enough to receive the countershaft 51 therein to seat the detent 78 behind the knob 76 (see Fig. 7). The thickness of the detent 78 is sufficient to hold the countershaft 51 in its extreme forward position when thus engaged behind the knob 76. Consequently whenever the locking plate 42 is in its lowermost position (Fig. 7) the countershaft 51 will be in its extreme forward position with its gears 53 and 54 disengaged from the gears 23 and 24.

The extra thickness of the detent 78 requisite to retain the countershaft 51 in its extreme forward position as described, has the additional function of supporting the locking plate 42 in its uppermost position and disposing a third detent 80 which is affixed at the lower edge of the aperture 44 of the locking plate 42 behind the flange 41 on the driven shaft 21. It is clear therefore, that so long as the locking plate 42 is in its highest position the driven shaft 21 is positively retained against being pushed inward far enough to cause the engagement between the teeth 33 and 34 which is necessary to establish direct drive. It will be understood therefore that the relationship between the knob 76 and the locking plate 42 is such that whenever the countershaft 51 is in its innermost position thereby engaging the change speed gearing, the possibility of connecting the driven shaft 21 to the driving shaft 16 is positively precluded, thereby providing positive assurance against damage to the machine which would result from simultaneous connection of both the direct drive and the change speed gearing.

Inasmuch as the problem of assuring adequate lubrication of the driven gear 27, which is revolubly mounted upon the inner or forward end of the driving shaft 16, is one which might present difficulties, I have devised a special means for assuring an adequate supply of lubricant thereto. An axial hole 81 is drilled into the driving shaft 16 from its inner end. The screw 28 which serves to anchor the disk 27 upon the end of the shaft 16 also acts as a plug to close the end of the hole 81. A radial hole 82 in the shaft 16 establishes communication between the axial hole 81 and an oil hole 83 extending downward in the rear leg 9 from its upper end to and through the bearing 84 in which the shaft 61 is journalled. Hence as the shaft 16 rotates, the hole 82 will come into registry with the oil hole 83 once during each rotation permitting oil in the oil hole 83 to flow into the center hole or reservoir 81. Another radial hole 85 is provided adjacent the inner end of the shaft 16 establishing communication between the reservoir 81 and the outer surface of the shaft 16 at a point thereon frictionally engaged by the revolubly mounted driven gear 14.

Figure 1 illustrates a preferred manner of mounting the machine of the present invention to afford the greatest convenience in performing the operations of drilling and tapping. The device is there illustrated as being mounted upon a suitable support such as a work bench 91. An electric motor 92 is mounted underneath the supporting surface 91, the driving pulley 93 of the motor 92 being connected to the pulley 17 by a driving belt 94, preferably a V-belt, in the conventional manner. A bracket 96 is mounted on the bench 91 in front of the machine, and preferably with an opening 97 in the bracket in alignment with the axis of rotation of the chuck 22. Also, a stop bracket 98 is mounted in front of the machine as by a pair of studs 99 threaded into the front leg 8 and extending horizontally forward therefrom to support the stop bracket 98 which also is provided with an opening 101 in axial alignment with the chuck 22 so that a drill or a tap 102 mounted in the chuck 22 can extend freely through the opening 101 as illustrated.

The bracket 96 is preferably mounted for ready removal, towards which end it preferably is affixed to a plate 103 adaptable to rest upon the upper surface of the bench 91 and to be located at a predetermined distance from the machine as by a pair of spaced cleats 104, 105. In the modification illustrated, the cleats 104, 105 are shown as being non-adjustably affixed to the work bench 91. This bracket 96 serves as a convenient support for any suitable jig (not shown) which may be used not only to support the work but also to locate it with respect to the working tool which is being operated by the rotating chuck 22. Moreover as the jig may serve as a guide to assure movement of the work toward and away from the working tool in accurate parallelism with the axis of the tool's rotation when such operations as drilling and tapping are being performed and accurately perpendicular with respect to that axis when such operations as milling, slotting and the like are being performed.

*Operation*

In order to facilitate gaining an understanding of the manner in which the power tool of the present invention operates, consider, for example, that a large number of metal plates of given size are each to be provided with a tapped hole at a given location on each plate. The appropriate size of drill for the proper operation of the particular tap to be employed is mounted in the chuck 22 and the motor 92 then started, it being understood that the machine is connected in direct drive, i. e., the teeth 34 engaged with the teeth 33 so that the chuck 22 is rotated at the same speed as the driving shaft 16. Each plate may then be drilled either by holding the plate and pressing it manually against the drill or by placing the plate accurately in predetermined position upon a jig carried by the bracket 96. The stop bracket 98 affords convenience as a depth gage to assure accurately drilling the hole to the required depth, it being understood that the stop bracket 98 is adjustable and can be locked in selected position by many suitable locking means, not shown.

After the hole has been drilled to the desired depth, preferably in all of the pieces to be operated upon, the motor 92 is stopped, the drill removed from the chuck 22 and in place of the drill a tap 102 mounted in the chuck 22 as illustrated in Fig. 1. The depth gage 98 should then be adjusted in accordance with the length of the tap 102, as will be readily understood. Then, in order to cause the chuck 22 to rotate at the reduced speed appropriate to the size of tap being employed, the direct drive should be disconnected and the reduction speed gearing engaged. Disconnection of the direct drive is effected by lifting the locking plate 42. The detents carried by the locking plate are mounted thereon in such relative position that as the locking plate moves upwards the first result thereof is the disengagement of the detent 46 from in front of the flange 41 which permits the spring 26 to press the driven gear 24 forward and thereby effect disengagement of the ratchet teeth 34 from the ratchet teeth 33. That is to say, these parts are moved from the positions thereof illustrated in Fig. 7 to their positions illustrated in Figs. 2 and 3.

The upward movement of the locking plate 42, however, should be continued until the lowermost detent 78 is lifted from behind the knob 76, whereupon the spring 59 will press the countershaft 51 inwards. In this manner, the gear 53 is enmeshed with the gear 23, and the small gear 54 becomes enmeshed with the large driven gear 24, thus establishing indirect drive; i. e., connection is established between the driving and the driven shafts 16 and 21, respectively, to cause rotation of the latter at reduced speed.

Figure 3:
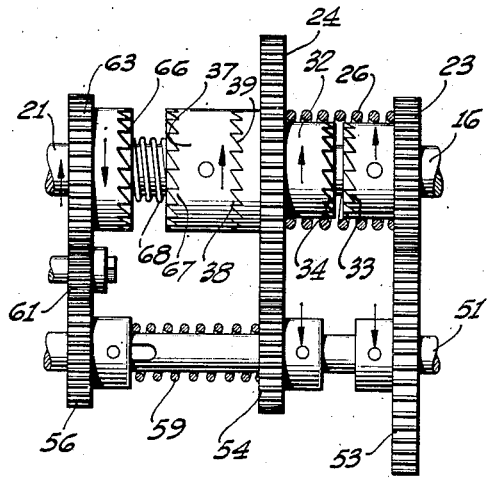
Figure 3 is a detail view in said elevation of the gearing alone in the same position as illustrated in Fig. 2.
Figure 4:
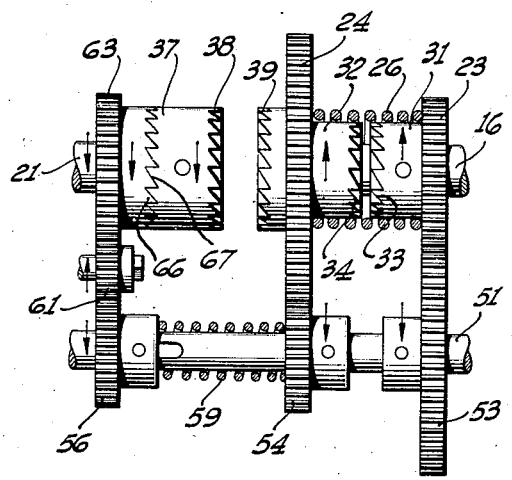
Figure 4 is a view similar to Fig. 3 but with the parts moved to the respective positions occupied thereby when a tap is being withdrawn.
Figure 5:
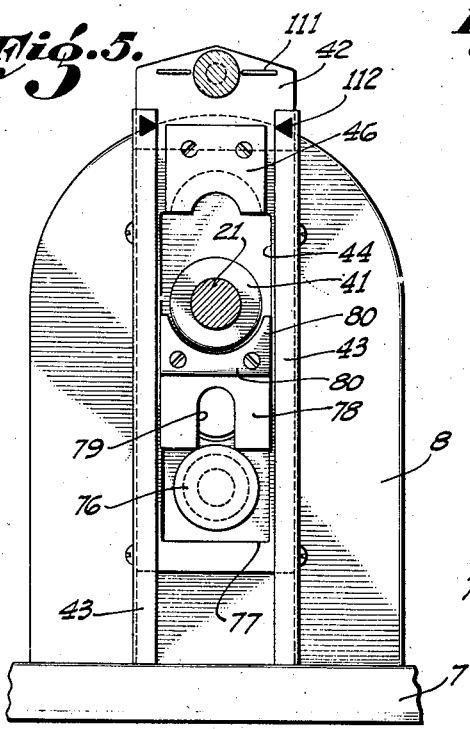
Figure 5 is a transverse, vertical, sectional view taken on a plane indicated by the line 5—5 of Fig. 2 with the direction of view as indicated, and illustrating the locking plate in that position wherein it retains the driven shaft out of direct connection with the driving shaft.

Then, with the proper size of tap mounted in the chuck 22, the motor 92 again should be started. One of the metal plates which previously has been drilled is then placed against the end of the tap 102 in such position that the tap enters the previously drilled hole. Here again the step of placing and guiding the work may be performed manually or through the expedient of a jig (not shown) rigidly supported in proper position by means of the bracket 96. If the depth gage 98 has been properly set the work being tapped will, when the tap 102 has cut its thread to the proper depth in the drilled hole, make contact with the bracket 98. This will arrest inward motion of the work, i. e., motion of the metal plate toward the chuck 22. Thereafter the chuck 22 will continue to rotate but for only a very short interval, and the tap 102 will continue to thread itself into the work, drawing the chuck 22 and the driven shaft 21 outwards. The effect of this outward motion of the shaft 21 will be to draw the head 37 towards the front leg 8 from its position in which it is illustrated in Fig. 3 to that of Fig. 4. Consequently the teeth 38 of the head 37 become disengaged from the teeth 39 of the driven gear 24; and the teeth 67 on the opposite face of the head 37 move into engagement with the teeth 66 on the hub 64 of the gear 63 which, as explained hereinabove, is being rotated in reverse direction. Consequently the chuck 22 will be reversely rotated as long as this engagement between the head 37 and the gear 63 prevails, and the tap will be withdrawn from the hole in which the operation of cutting threads now has been completed.

Figure 6:
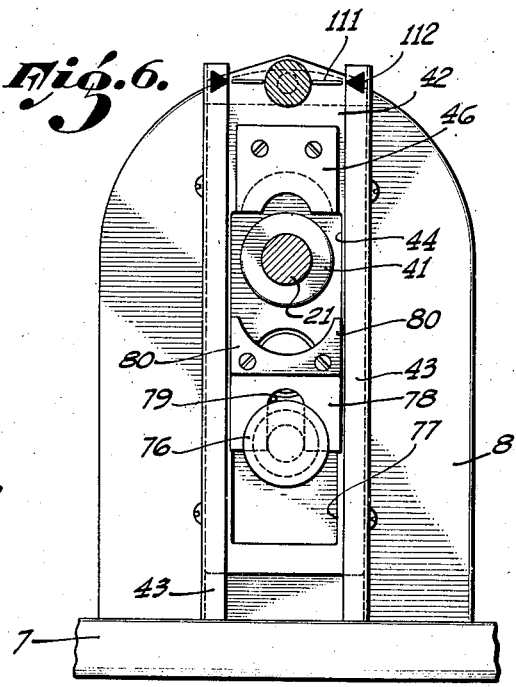
Figure 6 is a view similar to Fig. 5 showing the locking plate moved to its intermediate position.

When it is desired again to connect the machine in direct drive, the previously described manipulation of the locking plate 42 is reversed. The first step is that of pulling the countershaft 51 forwards by grasping the knob 76. Due to the extra thickness of the detent 78, which rides upon the upper edge of the knob 76 when the machine is connected in indirect drive, the locking plate 42 is held in its most elevated position until the countershaft 51 has been withdrawn to the limit of its forward movement, thus providing positive assurance that the direct drive cannot become engaged until after the gears 53 and 54 have moved to their Fig. 7 position, i. e., out of engagement with the gears 23 and 24 respectively, it being borne in mind that so long as the locking plate 42 is thus elevated the detent 78 is disposed behind the flange 41 (see Fig. 2), retaining the driven shaft in its extreme forward position as illustrated in Fig. 2 while the machine is connected in indirect drive. As soon as the countershaft 51 has been drawn forward, the locking plate 42 can be moved downwards to the position thereof illustrated in Fig. 6 wherein a gage mark 111 thereon aligns itself with an indicator 112 on one or both of the guide flanges 43. In this connection it should be mentioned that preferably the mounting of the stop plate 42 within the guide flanges 43 is sufficiently free to permit the plate 42 to drop by its own weight. When in the Fig. 6 position the detent 80 will have passed out from behind the flange 41 and the uppermost detent 46 will come to rest upon the periphery of the flange 41. The operator should then, by grasping the chuck 22, press the shaft 21 inwards. This will compress the spring 26 and bring the teeth 34 on the hub 32 of the gear 24 into engagement with the teeth 33 on the hub 31 of the gear 23 and thereby reestablish direct drive.

As an added feature, convenient means are provided for the removable support of additional working tools such as an emery wheel, milling cutter, or the like, and operating them by means of the machine of the present invention. For this purpose an axial hole 121 is provided in the extreme after end of the driving shaft 16. This hole 121 is provided with internal threads 122 preferably of left hand pitch thereby providing convenient means for supporting and driving a suitable arbor to serve as the spindle for numerous types of working tools such as those mentioned.

I claim:

1. In a power tool of the character described, a frame comprising front and back legs spaced apart to provide a gear chamber therebetween, a driving shaft and a driven shaft journalled respectively in said front and back legs in co-axial alignment and extending to a position adjacent each other within said chamber, said driven shaft being axially slidable with respect to said front leg and extending therethrough to the exterior of said frame, means carried by the outer end of said driven shaft for securing a working tool thereto, means carried by the inner end of said driven shaft for releasably coupling it to said driving shaft and thereby establishing direct drive when said driven shaft is in its innermost position, speed-change gearing operably mounted in said chamber, means operable to connect said gearing to both of said shafts to vary the speed at which said driven shaft turns, a detent movable optionally into or out of the path traversed by said gear-connecting means for releasably retaining said gears out of their connecting position, and means operably coupled to said detent for retaining said driven shaft in its outermost position until said gearing has been moved out of its connecting position.

2. In a power tool of the character described, a frame comprising front and back legs spaced apart to provide a gear chamber therebetween, a driving shaft and a driven shaft journalled respectively in said front and back legs in co-axial alignment and extending to a position adjacent each other within said chamber, said driven shaft being axially slidable with respect to said front leg and extending therethrough to the exterior of said frame, means carried by the outer end of said driven shaft for securing a working tool thereto, means carried by the inner end of said driven shaft for releasably coupling it to said driving shaft and thereby establishing direct drive when said driven shaft is at its innermost position, speed-change gearing operably mounted in said chamber, means operable to connect said gearing to both of said shafts to vary the speed at which said driven shaft turns, a detent movable optionally into or out of the path traversed by said gear-connecting means for releasably retaining said gears out of their connecting position, and means on said driven shaft locking said detent in that position wherein said detent retains said gears out of their connecting position, said detent-locking means being releasable only after said driven shaft has moved to its outermost position.

3. In a power tool of the character described, a frame comprising front and back legs spaced apart to provide a gear chamber therebetween, a driving shaft and a driven shaft journalled respectively in said front and back legs in co-axial alignment and extending to a position adjacent each other within said chamber, said driven shaft being axially slidable with respect to said front leg and extending therethrough to the exterior of said frame, means carried by the outer end of said driven shaft for securing a working tool thereto, means carried by the inner end of said driven shaft for releasably coupling it to said driving shaft and thereby establishing direct drive when said driven shaft is at its innermost position, speed-change gearing operably mounted in said chamber, means operable to connect said gearing to both of said shafts to vary the speed at which said driven shaft turns, a shoulder on said driven shaft, and a detent movable into the path of said shoulder only when said driven shaft is in its innermost position.

4. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, and means for releasably locking said countershaft in selected position of axial adjustment.

5. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable, said countershaft gears being disengaged from said driving and driven gears when said countershaft is in one end of its axial movement and said large gear being enmeshed with said driving shaft gear and said small gear being enmeshed with said driven shaft gear when said countershaft is at the other end of its axial movement, spring means urging said countershaft to said position of engagement of said gears, and releasable means for locking said countershaft in its said position of disengagement of said gear.

6. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, and means operable to hold said driven shaft in its innermost position and said countershaft in its said position of disengagement of said gears.

7. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, spring means urging said driven shaft to its outermost position, spring means urging said countershaft to its said position of engagement of said gears, and releasable means common to both said driven shaft and said countershaft resisting action of both of said spring means.

8. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, spring means urging said driven shaft to its outermost position, spring means urging said countershaft to its said position of engagement of said gears, a locking plate slidably mounted on said frame adjacent both said driven shaft and said countershaft, a shoulder on said driven shaft, a shoulder on said countershaft, and detents on said locking plate engageable with said shoulders to releasably hold said driven shaft in its innermost position and said countershaft in its said position of disengagement.

9. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, spring means urging said driven shaft to its outermost position, spring means urging said countershaft to its said position of engagement of said gears, a locking plate slidably mounted on said frame adjacent both said driven shaft and said countershaft, a shoulder on said driven shaft, a shoulder on said countershaft, and detents on said locking plate engageable with said shoulders to releasably hold said driven shaft in its innermost position and said countershaft in its said position of disengagement, said detent associated with said countershaft shoulder remaining in holding relation therewith as said locking plate is slid toward its unlocking position until after said detent associated with said driven shaft shoulder has been disengaged therefrom.

10. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, spring means urging said driven shaft to its outermost position, spring means urging said countershaft to its said position of engagement of said gears, a locking plate slidably mounted on said frame adjacent both said driven shaft and said countershaft, a shoulder on said driven shaft, a shoulder on said countershaft, detents on said locking plate engageable with said shoulders to releasably hold said driven shaft in its innermost position and said countershaft in its said position of disengagement, said detent associated with said countershaft shoulder remaining in holding relation therewith as said locking plate is slid toward its unlocking position until after said detent associated with said driven shaft shoulder has been disengaged therefrom, a second shoulder on said driven shaft, and a detent on said locking plate seating behind said second shoulder when said locking plate is in its unlocking position to restrain said driven shaft against inward movement.

11. In a power tool of the character described, a frame having a gear chamber therein, a driving shaft and a driven shaft revolubly mounted in co-axial alignment therein, said driven shaft being axially movable and extending to the exterior of said frame for connection to a working tool, means operable when said said driven shaft is in its innermost position for coupling it to said driving shaft, a countershaft journalled in said frame parallel to said driving and driven shafts, a large and a small gear affixed to said countershaft, a driving gear on said driving shaft, a driven gear, means connecting said driven shaft to said driven gear to be rotated thereby, said countershaft being axially slidable optionally to enmesh its gears with said driving and driven gears or to disengage them, spring means urging said driven shaft to its outermost position, spring means urging said countershaft to its said position of engagement of said gears, a locking plate slidably mounted on said frame adjacent both said driven shaft and said countershaft, a shoulder on said driven shaft, a shoulder on said countershaft, detents on said locking plate engageable with said shoulders to releasably hold said driven shaft in its innermost position and said countershaft in its said position of disengagement, said detent associated with said countershaft shoulder remaining in holding relation therewith as said locking plate is slid toward its unlocking position until after said detent associated with said driven shaft shoulder has been disengaged therefrom, a second shoulder on said driven shaft, and a detent on said locking plate seating behind said second shoulder when said locking plate is in its unlocking position to restrain said driven shaft against inward movement, said shoulder on said countershaft being arranged to move into the path of said detent associated therewith when said countershaft moves to its said position of engagement of its gears and thereby prevent release of said driven shaft by said detent associated with said second shoulder until said countershaft has been withdrawn from its said position of engagement of its gears.

ALFRED L. SOHM.